United States Patent [19]

Schubart et al.

[11] Patent Number: 5,804,668
[45] Date of Patent: Sep. 8, 1998

[54] POLYMER COMPOUNDS AND THE USE THEREOF FOR VULCANISING RUBBERS CONTAINING HALOGEN

[75] Inventors: Rüdiger Schubart; Rüdiger Musch, both of Bergisch Gladbach, Germany

[73] Assignee: Bayer AG, Leverkusen, Germany

[21] Appl. No.: 847,118

[22] Filed: May 1, 1997

[30] Foreign Application Priority Data

May 9, 1996 [DE] Germany ................. 196 18 571.8

[51] Int. Cl.$^6$ ........................................ C08F 8/30
[52] U.S. Cl. .................. 525/331.1; 525/368; 525/372; 525/374; 525/375
[58] Field of Search ............... 525/331.1, 368, 525/372, 374, 375

[56] References Cited

U.S. PATENT DOCUMENTS

| | | | |
|---|---|---|---|
| 2,888,444 | 5/1959 | Roberts et al. | 524/256 |
| 5,210,152 | 5/1993 | Musch et al. | 525/368 |
| 5,646,098 | 7/1997 | Brois | 508/189 |

FOREIGN PATENT DOCUMENTS 0 763 561  3/1997  European Pat. Off. .
784189   10/1957  United Kingdom .

OTHER PUBLICATIONS

Orbit Abstract of EP 0 763 561 (Mar. 19, 1997).

Database WPI, Section Ch, Week 9613, Derwent Publications Ltd., London, GB, AN 96–124190, Abstract of JP 08 020 693 A (Exxon Chem Patents Inc), Jan. 23, 1996.

Abstract of DE 39 42 463 (Jun. 27, 1991).

W. Hofmann, *Vulkanisation & Vulkanisationshilfsmittel*, Verlag Berliner Union GmbH, Stuttgart, pp. 274–276 (1965).

*Primary Examiner*—Terressa Mosley
*Attorney, Agent, or Firm*—Connolly & Hutz

[57] ABSTRACT

The polymer compounds according to the invention prepared from specific amidines, zinc mercapto compounds and elastomers are ideally suitable for the production of thermally stable rubber vulcanisates containing halogen. The vulcanisates of rubbers containing halogen obtained by means of the polymer compounds are distinguished by a reduced tendency towards unwanted post-vulcanization and, at elevated storage temperatures, are resistant to thermal and oxidative degradation.

2 Claims, No Drawings

POLYMER COMPOUNDS AND THE USE THEREOF FOR VULCANISING RUBBERS CONTAINING HALOGEN

This invention relates to polymer compounds prepared from amidines, zinc mercapto compounds and polymers and to the use thereof for vulcanizing rubbers containing halogen. The vulcanisates of rubbers containing halogen obtained by means of the polymer compounds are distinguished by a reduced tendency towards unwanted post-vulcanization and, at elevated storage temperatures, are resistant to thermal and oxidative degradation. Moreover, use of the stated polymer compounds has a positive effect on the physical properties of the vulcanized rubbers.

As is known, polychloroprenes may be vulcanized by treatment with, for example, diamines, diphenols, thioureas and/or metal oxides. In general, a distinction must be drawn between those grades which are modified with sulphur and those which are not: for the former, using metal oxides alone is generally sufficient, whereas due to the lower crosslinking tendency of those polychloroprenes not modified with sulphur, it is necessary to use specific vulcanization accelerators in addition to the metal oxides which are also required; c.f. W. Hofmann, *Vulkanisation & Vulkanisationshilfsmittel*, Verlag Berliner Union GmbH, Stuttgart 1965, page 274.

The metal oxides conventionally used are zinc oxide as a crosslinking agent and magnesium oxide predominantly as a chlorine acceptor. Using zinc oxide alone results in rapid scorching and complete vulcanization, but also in unsatisfactory crosslinking. While using magnesium oxide alone does indeed make processing more reliable, it unfortunately also results in a very slow course of the vulcanization reaction and in very low degrees of vulcanization. When magnesium oxide and zinc oxide are used simultaneously, a synergistic vulcanizing effect is achieved and, at an appropriate mixing ratio, a balanced combination of scorch time and achievable degree of vulcanization.

Nonetheless, the optimum degree of vulcanization is not achieved for either sulphur-modified or non-sulphur-modified polychloroprenes, and instead gradual post-curing occurs, to which the ageing behavior of polychloroprene vulcanisates may also be attributed, preferably on exposure to elevated temperatures, in particular accompanied by dynamic loads.

Ageing resistance may be improved by adding antioxidants based on diphenylamine, phenylenediamine, phenol, enol ether or mercaptobenzimidazole, wherein mercaptobenzimidazole distinctly reduces the storage stability of the unvulcanized mixture.

DE-A 39 42 463 also describes a process in which the stability of polychloroprene vulcanisates is favorably influenced by the presence of amidines and metal oxide, which contains no magnesium oxide. The resultant vulcanisates age less severely, which is discernible from a reduced decline in mechanical properties. However, this process too has an unfavorable influence on the storage life of mixtures, i.e. the premature vulcanization and scorch times become distinctly shorter. This is particularly pronounced in mixtures containing sulphur-modified polychloroprene.

This unfavorable storage behavior of the mixtures may be improved by adding compounds prepared from amidines and mercapto compounds on polymeric supports (see DE-A 19534621).

It has surprisingly now been found that adding polymer-bound blends of amidines and certain zinc mercapto compounds distinctly improves both the storage life of the unvulcanized mixtures and the aging resistance of the vulcanisates in comparison with the above-stated processes. Furthermore, the properties of the vulcanized rubbers are also favorably influenced.

The present invention accordingly provides polymer compounds consisting of
 a) cyclic and/or acyclic amidines,
 b) zinc salts of mercapto compounds of benzothiazole, benzimidazole, benzopyrimidine and/or benzotriazine and
 c) ethylene/propylene rubbers (EP(D)M), ethylene/vinyl acetate rubbers (EVM), butadiene rubbers (BR), styrene/butadiene rubbers (SBR), natural rubbers (NR), butadiene/acrylonitrile rubber (NBR) and/or butyl rubbers (IIR),
wherein components a) and b) are present in the compound in a molar ratio of 0.25:1 to 2:1, preferably of 0.5:1 to 1.5:1, and the proportion of the polymer binder c) is 90 to 10 wt. %, preferably 30 to 60 wt. %, relative to the total weight of components a) to c).

Cyclic or acyclic amidines which may be used for the polymer compounds according to the invention are amidines according to DE-A 3 942 463, wherein compounds of the general formula III and IV described therein are preferred. It is very particularly preferred to use 1,5-diazabicyclo[5.4.0]undec-11-ene (DBU) or 1,5-diazabicyclo[4.3.0]non-5-ene (DBN). The amidines may, of course, also be apportioned in solid form adsorbed on organic or inorganic supports, for example kaolin, chalk or activated carbon.

Zinc salts of mercapto compounds which may be considered are zinc mercapto compounds of benzothiazole, benzimidazole, benzopyrimidine and/or benzotriazine. The zinc mercapto compounds of benzothiazole, of benzimidazole and of 4,5-methylbenzimidazole are preferred, wherein zinc mercaptobenzimidazole and zinc 4-methyl- or zinc 5-methylmercaptobenzimidazole or mixtures thereof are particularly preferred.

EP(D)M and EVM may in particular be considered as the polymer component c).

Components a) to c) may each be used both individually and in any desired mixtures with each other. In the event that mixtures of amidines a), zinc mercapto compounds b) or polymers c) with each other are used, the most favorable mixing ratio may readily be determined by appropriate preliminary testing. This ratio is then also dependent upon the desired range of properties of the vulcanisates to be produced. The polymer compounds according to the invention may be produced in the conventional manner by mixing components a) to c) in conventional mixing units, such as internal mixers, extruders or roll mills, wherein further rubber auxiliary substances or supports, such as carbon black, chalk, kaolin, silica, plasticizer, dyes, biocides and/or vulcanization accelerators may be added to components a) to c). Once components a) to c) have been blended in the conventional mixing units, the polymer compounds are then converted into a conventional form for use, such as pellets.

The present invention also provides the use of the polymer compounds described above in the vulcanization of rubbers containing halogen, alone or in combination with other rubbers. The polymer compounds according to the invention are used in vulcanization in a quantity of 0.1 to 20 parts by weight per 100 parts by weight of rubber.

Preferred rubbers containing halogen, which may be blended with the polymer compound according to the invention prior to vulcanization, are polychloroprene rubbers, chlorobutyl rubbers, bromobutyl rubbers, chlorinated polyethylene, chlorosulphonated and alkylated, chlorosulphonated polyethylene and/or chlorinated polybutadiene, preferably polychloroprenes and chloro- and bromobutyl rubbers and mixtures thereof. The rubbers containing halogen are known and described, for example, in *The Synthetic Rubber Manual*, 11th edition, Internat. Institute of Synthetic Rubber Producers Inc., Houston, Tex. and in *Ullmann's Encyclopedia of Industrial Chemistry*, volume A23, 1993, 239–365.

According to the invention, the polymer compounds are mixed with the rubbers containing halogen prior to vulcanization in conventional mixing units. Preferred mixing units are the kneaders, roll mills and compounding extruders conventional in the rubber industry, which generally operate at shear rates of 1 to 1000 $sec^{-1}$, preferably of 1 to 200 $sec^{-1}$.

and the material comminuted. The batches produced in this manner are shown in Table 2, no. D-G.

Continuous process:

The three components were continuously introduced at temperatures of up to 100° C. into a model ZSK 32 twin screw extruder with a discharge die, mixed at 60 rpm and discharged through the die as an extrudate. The extrudate was cooled with nitrogen, pelletised and lightly coated with talcum. The compounds produced in this manner are shown in Table 2 under Examples A-C.

TABLE 2

| | | | | | | |
|---|---|---|---|---|---|---|
| | | | Examples according to the invention | | | |
| No. | Polymer | Quantity g | Mercapto compound | Quantity in g/mol | Amidine | Quantity in g/mol |
| A*) | AP 470 | 1500 | Vulkanox-MB-2 | 815/4.9 | DBU | 675/4.4 |
| B | AP 470 | 1500 | Vulkanox-ZMB-2 | 815/2.08 | DBU | 675/4.4 |
| C | AP 470 | 1500 | Vulkanox-ZMB-2 | 815/2.08 | DBU | 316/2.08 |
| D*) | AP 147 | 20 | Vulkanox-MB-2 | 75/0.45 | DBU | 50/0.32 |
| | Levapren 452K | 80 | | | | |
| E | AP 147 | 20 | Vulkanox-ZMB-2 | 175/0.45 | DBU | 50/0.32 |
| | Levapren 452K | 80 | | | | |
| F*) | Levapren 452K | 100 | Vulkanox-MB-2 | 75/0.45 | DBU | 50/0.32 |
| G | AP 147 | 20 | Vulkanox-ZMB-2 | 200/0.51 | DBU | 50/0.32 |
| | Levapren 452K | 80 | | | | |

*)Comparative Examples

Vulcanization may proceed at temperatures of 20° to 250° C., preferably of 140° to 210° C., optionally under a pressure of 10 to 200 bar. The vulcanisates produced according to the invention may advantageously be used in any applications where exposure to elevated temperatures and dynamic loads entail a risk of premature aging, thus for example in axle bellows, V-belts, toothed belts, conveyor belts, buffers, spring components and radiator hoses.

EXAMPLES

TABLE 1

Starting materials used in the production of the Examples according to the invention and the Comparative Examples

| Starting materials | Material used[1] |
|---|---|
| 1,5-diazabicyclo(5.4.0)undecene-11 | DBU |
| 4/5-methylmercaptobenzimidazole (mixture) | Vulkanox MB 2 |
| Zinc salt of 4/5-methylmercaptobenzimidazole (mixture) | Vulkanox ZMB-2 |
| EPDM polymer | AP 470 |
| | AP 147 |
| EVM polymer | Levapren 452 K |
| Polychloroprene, general purpose grade | Baypren 210 |
| Bromobutyl polymer | Brombutyl X2 |

[1])Commercial and trade products of Bayer AG and its subsidiaries.

Production of Compounds

Batch process:

The polymer was first masticated in a coolable roll mill at 40° C., a friction of 1:1.2 (20:24 rpm) and a nip of 0.4 mm until a continuous milled sheet was formed. The mercapto compounds, followed by the amidine, were then added and incorporated. Once both substances were had been uniformly distributed, the milled sheet was sheeted out thinly The following standard and product-specific formulations illustrate the advantages according to the invention in comparison with the prior art.

Production of mixtures, vulcanization and vulcanisate testing (Performed with reference to ISO instructions 2475–1975 (E).)

Before the actual production of the mixture, 1000 g of polychloroprene were masticated for 6 minutes, the nip being adjusted such that a roll of material of a diameter of approximately 12 mm was formed. After mastication, 800 g of the rubber were taken and stored for at least 10 and at most 120 minutes.

Roll mill: 200×390 mm

Temperature: 45°–55° C.

Friction: 1:1.4 (24:34 rpm)

Before the beginning of mixing, the roll mill, which had been adjusted to 30° C., was heated to the stated lower limit of the operating temperature with waste rubber.

The mixing sequence and times were in accordance with the above information. After a mixing time of 13 minutes, the milled sheet was worked for one minute with alternating incisions (three times on the left, three times on the right) and, within a further 2 minutes, was drawn 6 times through a 0.8 mm nip, giving a total mixing time of 16 minutes.

The mixture was stored overnight until vulcanization.

The test data were determined in accordance with the appropriate DIN instructions for soft rubber as shown in Table 3.

TABLE 3

Test standards for rubber workpieces:

| Property | Unit | DIN test method |
|---|---|---|
| Polymer/Mixture: | | |
| Mooney viscosity | MU | 53523 |
| Mooney scorch time | min | 53523 |
| Rheometer (Monsanto MDR 2000) | min | 53529 |
| Vulcanisate values: | | |
| Strength | MPa | 53504 |
| Elongation | | 53504 |
| Modulus | MPa | 53504 |
| Hardness | Shore A | 53505 |
| Hot air ageing | various | 53508 |

Storage stability of mixtures and vulcanisates (Table 4)

In comparison with the standard formulation to ISO 2475 (Example 1), a standard mixture containing no MgO cannot be stored when Vulkanox MB-2, Vulkanox ZMB-2 or DBU are added (Examples 2 to 4). Storage stability is somewhat improved by the combination of DBU and Vulkanox MB-2 in Example 5.

In this case, production according to the invention as a DBU/Vulkanox ZMB-2 batch and addition to the mixture (Examples 6, 7) results in a mixture which is distinctly more stable in storage, as may be seen from the slower rise in Mooney viscosity and scorch times (MS-t5) at 120° C. and 130° C. At a comparable storage stability (Examples 1, 6, 7), hot air aging of the vulcanisates is considerably improved by the compound according to the invention.

Effectiveness of the compound according to the invention (Table 5)

In comparison with the compounds based on DBU/Vulkanox MB-2 (Example 8), the compound according to the invention (Example 9) improves the storage life of the mixture and results in more rapid complete vulcanization. At comparable mechanical properties, hot air resistance is distinctly improved.

Effectiveness of the compound in bromobutyl rubber (Table 6)

As in polychloroprene, addition of the compound according to the invention to other halorubbers, for example to bromobutyl rubber, in Example 11 also brings about an improvement in storage stability of the accelerated mixture (MS-t %/ 120° C.), more rapid complete vulcanization and better hot air stability in comparison with another stabilizer combination (Example 10).

TABLE 4a

Storage stability of mixtures and vulcanisates

| No. | 1* | 2* | 3* | 4* | 5* | 6 | 7 |
|---|---|---|---|---|---|---|---|
| Formulation | | | | | | | |
| Baypren | 100 | 100 | 100 | 100 | 100 | 100 | 100 |
| Stearic acid | 0.5 | 0.5 | 0.5 | 0.5 | 0.5 | 0.5 | 0.5 |
| Carbon black N 772 | 30 | 30 | 30 | 30 | 30 | 30 | 30 |
| MgO paste | 5.3 | — | — | — | — | — | — |
| Vulkanox MB-2 | — | 1.0 | — | — | — | — | — |
| Vulkanox ZMB-2 | — | — | 1.0 | — | — | — | — |
| DBU | — | — | — | 1.0 | — | — | — |
| Compound A | — | — | — | — | 4.4 | — | — |
| Compound B | — | — | — | — | — | 4.4 | — |
| Compound C | — | — | — | — | — | — | 6.0 |
| ZnO | 5.0 | 5.0 | 5.0 | 5.0 | 5.0 | 5.0 | 5.0 |
| Vulkacit NPV/C | 0.5 | 0.5 | 0.5 | 0.5 | 0.5 | 0.5 | 0.5 |

Mixture properties: storage at room temperature and scorching behaviour ML-1 + 4/100° C.

| | | 1* | 2* | 3* | 4* | 5* | 6 | 7 |
|---|---|---|---|---|---|---|---|---|
| 0 days | [MU] | 53.4 | 69.0 | 66.2 | 49.6 | 58.3 | 50 | 52.2 |
| 21 days | [MU] | 57.4 | >200 | 84 | 63.3 | 67.2 | 54.5 | 56.5 |
| Diff. 0–21 days | [ME] | 4.0 | >130 | 18 | 13.6 | 8.9 | 4.5 | 4.3 |
| MS-t5/ 120° C. | min | 10.1 | 5.9 | 7.3 | 8.8 | 9.8 | 10.2 | 11 |
| MS-t5/ 130° C. | min | 6.6 | 4.0 | 5.2 | 5.9 | 6.4 | 6.7 | 7.3 |

*Comparative Example

TABLE 4b

Storage stability of mixtures and vulcanisates

| No. | 1* | 2* | 3* | 4* | 5* | 6 | 7 |
|---|---|---|---|---|---|---|---|
| Formulation | | | | | | | |
| Baypren | 100 | 100 | 100 | 100 | 100 | 100 | 100 |
| Stearic acid | 0.5 | 0.5 | 0.5 | 0.5 | 0.5 | 0.5 | 0.5 |
| Carbon black N 772 | 30 | 30 | 30 | 30 | 30 | 30 | 30 |
| MgO paste | 5.3 | — | — | — | — | — | — |
| Vulkanox MB-2 | — | 1.0 | — | — | — | — | — |
| Vulkanox ZMB-2 | — | — | 1.0 | — | — | — | — |
| DBU | — | — | — | 1.0 | — | — | — |
| Compound A | — | — | — | — | 4.4 | — | — |
| Compound B | — | — | — | — | — | 4.4 | — |
| Compound C | — | — | — | — | — | — | 6.0 |
| ZnO | 5.0 | 5.0 | 5.0 | 5.0 | 5.0 | 5.0 | 5.0 |
| Vulkacit NPV/C | 0.5 | 0.5 | 0.5 | 0.5 | 0.5 | 0.5 | 0.5 |

Vulcanisate properties: Hot air ageing, 14 and 21 days at 100° C., standard bar S-2 Change in mechanical values

| | | 1* | 2* | 3* | 4* | 5* | 6 | 7 |
|---|---|---|---|---|---|---|---|---|
| 14 d increase in modulus | (%) | 272 | 94 | 205 | 159 | 23 | 20 | 17 |
| 14 d increase in hardness | Shore A | 15 | 7 | 13 | 13 | 2 | 1 | 0 |
| 21 d increase in modulus | (%) | | | 344 | 286 | 50 | 44 | 10 |
| 21 d increase in hardness | Shore A | | | 20 | 20 | 10 | 8 | 2 |

*Comparative Example

TABLE 5

Effectiveness of the compounds according to the invention on polychloroprene vulcanisates

| No. | 8*) | 9 |
|---|---|---|
| Formulation | | |
| Baypren 210 | 100 | 100 |
| Stearic acid | 0.5 | 0.5 |
| Carbon black N 772 | 30 | 30 |
| Zinc white RS | 5.0 | 5.0 |

TABLE 5-continued

Effectiveness of the compounds according to the invention on polychloroprene vulcanisates

| No. | | 8*) | 9 |
|---|---|---|---|
| Vulkacit NPV/C | | 0.5 | 0.5 |
| Compound (polymer base EPDM/EVM = 20/80) | | | |
| Compound D | | 4.5 | — |
| Compound E | | — | 6.5 |
| Mixture properties | | | |
| MS-t5/120° C. | (min) | 9.8 | 10.2 |
| MS-t5/130° C. | (min) | 6.1 | 7.8 |
| Monsanto MDR 2000/150° C. | | | |
| $t_{10}$ | (min) | 2.3 | 2.1 |
| $t_{80}$ | (min) | 17.6 | 14.1 |
| $t_{90}$ | (min) | 27.3 | 21.7 |
| Vulcanisate properties: standard bar S-2 | | | |
| Heating time: 150° C./t90 + 5 min | | | |
| Tensile strength | (MPa) | 23.9 | 23.6 |
| Elongation at break | (%) | 501 | 516 |
| Modulus M100 | (MPa) | 2.7 | 3.1 |
| Modulus M200 | (MPa) | 6.6 | 7.0 |
| Modulus M300 | (MPa) | 13.5 | 13.2 |
| Hardness, 23° C. | (Shore A) | 64 | 67 |
| Hot air ageing at 100° C.: standard bar S-2 | | | |
| 7 d increase in modulus | (%) | 14 | 6 |
| 7 d increase in hardness | (Shore A) | 0 | 0 |
| 14 d increase in modulus | (%) | 118 | 45 |
| 14 d increase in hardness | (Shore A) | 8 | 5 |
| 21 d increase in modulus | (%) | 181 | 148 |
| 21 d increase in hardness | (Shore A) | 11 | 10 |

*) Comparative Example

TABLE 6

Effectiveness of compounds in bromobutyl
Example: Bromobutyl-based drive belt formulation

| No. | | 10*) | 11 |
|---|---|---|---|
| Fomulation | | | |
| Bromobutyl X2 | | 25 | 25 |
| Stearic acid | | 1 | 1 |
| Statex N 330 carbon black | | 50 | 50 |
| Vulkanox DDA | | 2 | 2 |
| Sunpar 2280 | | 9 | 9 |
| Active zinc oxide | | 5 | 5 |
| Compound F | | 4.5 | |
| Compound G | | — | 7 |
| Mixture properties | | | |
| ML 1 + 4/100° C. | (MU) | 89.1 | 83.7 |
| MR | (%) | 22.2 | 19.4 |
| MS-t5/120° C. | (min) | 4.1 | 5.9 |
| Monsanto MDR 2000 (170° C./40 min) | | | |
| ts02 | (min) | 1.2 | 1.7 |
| $t_{10}$ | (min) | 0.7 | 0.9 |
| $t_{80}$ | (min) | 12.3 | 9.7 |
| $t_{90}$ | (min) | 18.0 | 12.5 |
| dF | (dNm) | 9.9 | 9.4 |
| Vulcanisate properties: standard bar S-2 | | | |
| Heating time, 170° C. | (min) | 23 | 18 |
| Tensile strength | (MPa) | 15 | 16.1 |
| Elongation at break | (%) | 251 | 257 |
| Modulus M100 | (MPa) | 3.9 | 4.7 |
| Modulus M200 | (MPa) | 11.4 | 12.7 |
| Hardness, 23° C. | (Shore A) | 63 | 67.5 |
| Tear propagation resistance | N/mm | 9.1 | 9.2 |
| Hot air ageing at 150° C.: standard bar S-2 | | | |
| 3 d change in elongation | (%) | +17 | 0 |
| 3 d change in modulus | (%) | −15 | −13 |
| 3 d change in hardness | (Shore A) | +1 | +1 |
| 7 d change in elongation | (%) | +26 | +4 |
| 7 d change in modulus | (%) | −16 | −10 |
| 7 d change in hardness | (Shore A) | +3 | +1 |
| 14 d change in elongation | (%) | +57 | +3 |
| 14 d change in modulus | (%) | −57 | −15 |
| 14 d change ia hardness | (Shore A) | −2 | +2 |
| 21 d change in elongation | (%) | +68 | +11 |
| 21 d change in modulus | (%) | −65 | −45 |
| 21 d change in hardness | (Shore A) | −3 | +1 |

*)Comparative Example

We claim:

1. A polymer compound consisting of a) cyclic and/or acyclic amidines, b) zinc salts of mercapto compounds of benzothiazole, benzimidazole, benzopyrimidine and/or benzotriazine and c) ethylene/propylene rubbers (EPM), ethylene/propylene/diene rubbers (EPDM), ethylene/vinyl acetate rubbers (EVM), butadiene rubbers (BR), styrene/butadiene rubbers (SBR), natural rubbers (NR), butadiene/acrylonitrile rubbers (NBR) and/or butyl rubbers (IIR), wherein components a) and b) are present in the polymer compound in a molar ratio of 0.25:1 to 2:1 and the proportion of component c) is 90 to 10 wt. %, relative to the total weight of components a) to c).

2. A method of using the polymer compound according to claim 1 in the vulcanization of rubbers containing halogen, wherein said polymer compound is mixed with rubbers containing halogen prior to said vulcanization.

* * * * *